March 9, 1926.  
E. G. SIMPSON ET AL  
1,576,150  
WINDSHIELD PANEL AND WEATHER SILL  
Filed March 17, 1924
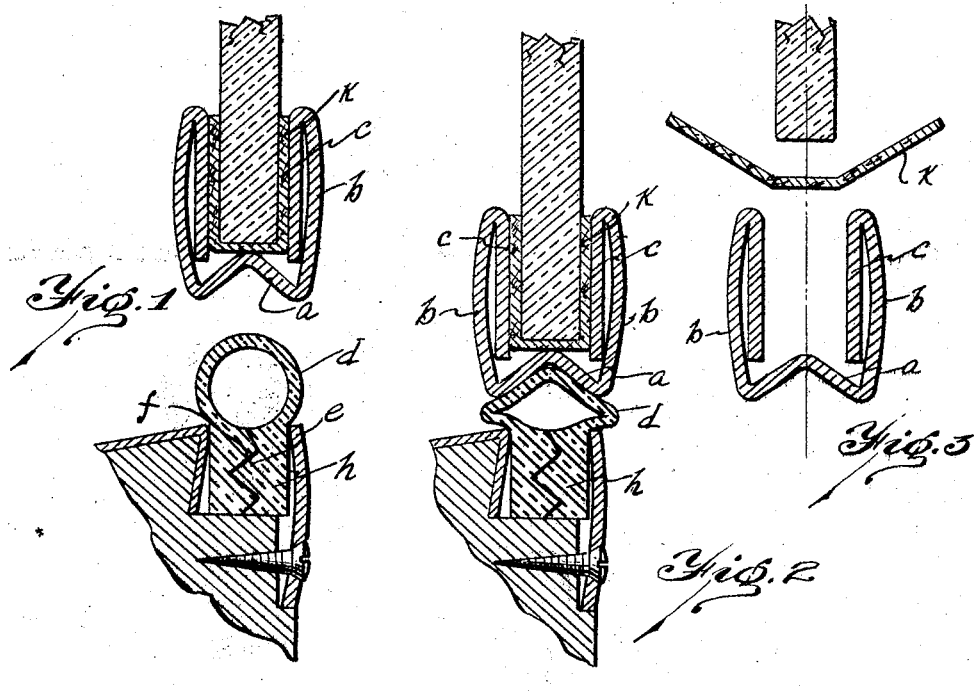
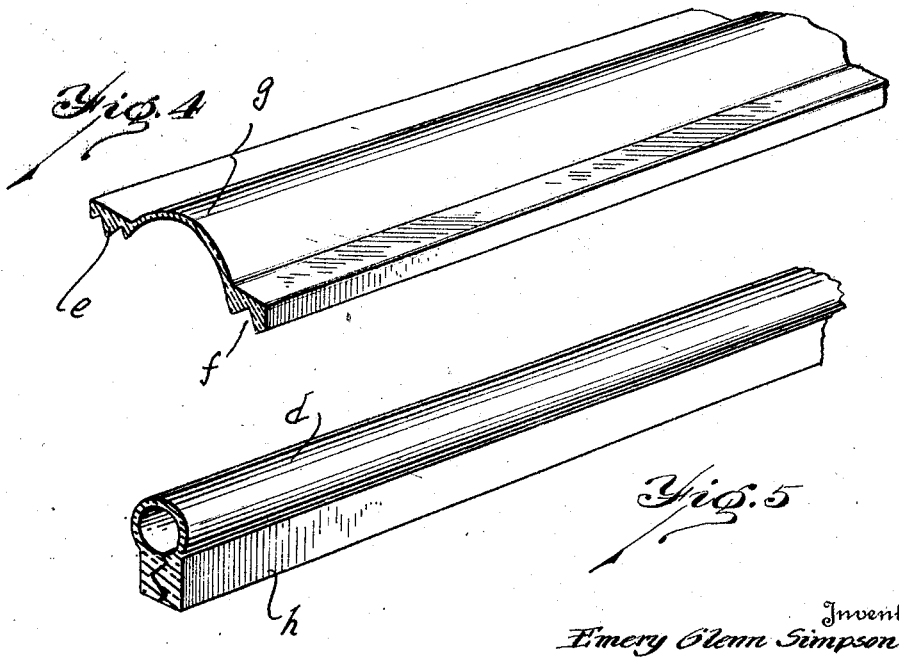
Inventors  
Emery Glenn Simpson  
Albert Haberer  
By Stuart C. Barnes  
Attorney Patented Mar. 9, 1926.

1,576,150

UNITED STATES PATENT OFFICE.

EMORY GLENN SIMPSON AND ALBERT HABERER, OF DETROIT, MICHIGAN, ASSIGNORS TO FISHER BODY CORPORATION, OF DETROIT, MICHIGAN, A CORPORATION OF NEW YORK.

WINDSHIELD PANEL AND WEATHER SILL.

Application filed March 17, 1924. Serial No. 699,843.

*To all whom it may concern:*

Be it known that we, EMORY GLENN SIMPSON and ALBERT HABERER, citizens of the United States, residing at Detroit, in the county of Wayne and State of Michigan, have invented certain new and useful Improvements in Windshield Panels and Weather Sills, of which the following is a specification.

This invention relates to a windshield channel and a weather seal. It is the object of the present invention to provide a windshield channel which can be easily and cheaply constructed and which will provide a suitable weather seal for a window which can be raised and lowered.

In the drawings:

Fig. 1 is a cross section of the channel and a portion of the sill.

Fig. 2 is a similar view showing the channel in engagement with the weather strip.

Fig. 3 is a section showing how the assembly of the glass and channel is effected.

Fig. 4 is a perspective of a portion of the weather strip as the same is manufactured.

Fig. 5 is a perspective of a portion of the weather strip in position to be used.

In closed body construction it has been found more desirable to have the windshield panel first lift and then swing. The construction that has been in almost universal use comprises a channel that is arranged to fit tightly over a tapered steel fence. This construction is described and claimed in the Allmand Patent No. 1,147,836. This construction has been highly satisfactory in making a weather tight fit and preventing rattling but is open to the objection of very often the channel becomes rusted upon the fence especially in the winter time when the lower panel is never raised. It therefore becomes almost impossible to dislodge it. Furthermore, the channel shown in this construction is relatively expensive to construct as compared with the channel and the weather strip shown in the present application.

A channel of this kind is ordinarily manufactured by passing through suitable rolls and suitable rolls and dies. It is manufactured rapidly by these rolling machines and it is therefore desirable to have the design of the channel as simple as possible to roll. Numerous designs of windshield channel have been disclosed and patented but so far as I am aware, the windshield channel here described and claimed is the simplest that has yet been brought out and which has the necessary thickness to hold a long panel of glass and prevent the same from breaking.

The conventional windshield channel is quite similar to that shown in the Allmand patent above referred to, ordinarily, however, without the V groove at the bottom. Such a channel has been welded, has been formed of seamless tube, has been lock-seamed, as shown in the McIntosh Patent No. 1,349,684, and recently most of it has been made with what is called a lap seam.

Now, we construct a semi-tubular windshield member, but in place of employing a bottom for the channel itself, the bottom of the tube itself is buckled up for a double purpose. This bottom is designated $a$ and comprises a shallow inverted V; the sides of the channel are somewhat elliptical and these are designated $b$. The edges of the strip are bent down to form the side walls of the channel and are designated $c$. The bottom of the channel is not formed in the customary way by a web from one of these side walls being passed across the bottom and either lock-seamed with the other side wall or lap-seamed therewith. On the contrary, the edges of the strip terminate with the side walls of the channel and the channel has no bottom save at the center where the bottom wall of the tube is bent up to form a rest for the glass. This bent up bottom not only serves to form the bottom of the channel, but it serves the additional function of providing a V groove in the bottom of the tube which is adapted to rest on the opposite sides of the fence weather strip $d$.

This fence or weather strip is preferably constructed of readily distortable material such as rubber which is hollow to make it more easily distortable. In order to make a weather strip which may be easily and quickly manufactured, we form this weather strip out of a strip or ribbon such as shown in Fig. 4 with tongues and grooves $e$ and $f$ on the bottom of the strip near the edges and a bowed central portion $g$. The edges of this strip can be bent together and the tongues and grooves interlocked as shown in Figs. 1, 2, and 5 to provide the fence or weather strip having a solid stem or anchor portion and a hollow sealing portion of circular cross section.

When the window drops down upon this as shown in Fig. 2, the shallow V groove in the bottom of the semi-tube contacts both sides of the circular sealing portion of the strip; this forms an effective contact area and allows a large portion of the strip to forcibly engage up in the apex of the V to absolutely seal the joint at this point and prevent either the weather, water or dust blowing through.

The glass assembly in the channel is shown in Fig. 3; a cork strip k is adapted to fit over the bottom of the glass panel; the glass together with the strip, may then be forced in between the side walls of the channel. The cork strip itself is highly compressible and consequently the dimensions are such that when the glass is fitted in the cork strip is squeezed in pretty tightly. Then further, the side walls of the channel being absolutely free are capable of yielding to a small extent and further, form a very good grip upon the glass. With this arrangement it is unnecessary to use cement. The yieldable cork strip and the yieldable side walls of the channel will grasp the glass and at the same time the cork strip forms a cushion for the bottom of the glass. The apex of the shallow V groove forms a support for the cork channel.

What we claim is:

1. In windshield and window construction, the combination of a fence of deformable material and a metal channel formed of a strip of metal shaped to form a shallow inverted V groove in the bottom and provided with side walls turned over inside to form the side walls of the glass retaining channel but terminating at the bottom of the channel, the top of the V groove forming the support for the glass and the said V groove arranged to fit over the deformable fence.

2. In windshield and window construction, the combination of a fence of deformable material and a metal channel for supporting the glass and comprising a single strip formed with turned in edges to form side walls only of the glass retaining channel and having the middle portion of the strip buckled up to form a shallow V groove to support the bottom of the glass and form a groove to fit over the deformable fence.

3. In windshield and window construction, a metal windshield channel comprising a single piece having side walls folded over to form the inside walls of the glass retaining channel but terminating at the bottom of said channel the middle portion of the strip being buckled up at the center to form an inverted V groove upon which the bottom of the glass rests.

4. In windshield and window construction, the combination of a fence of deformable material having a hollow sealing portion and a metal windshield panel provided with an inverted V groove, the top of the V groove forming a support for the glass and the bottom of said V groove arranged to fit over the deformable fence for distorting the same.

In testimony whereof we affix our signatures.

EMORY GLENN SIMPSON.
ALBERT HABERER.